Figure 1:
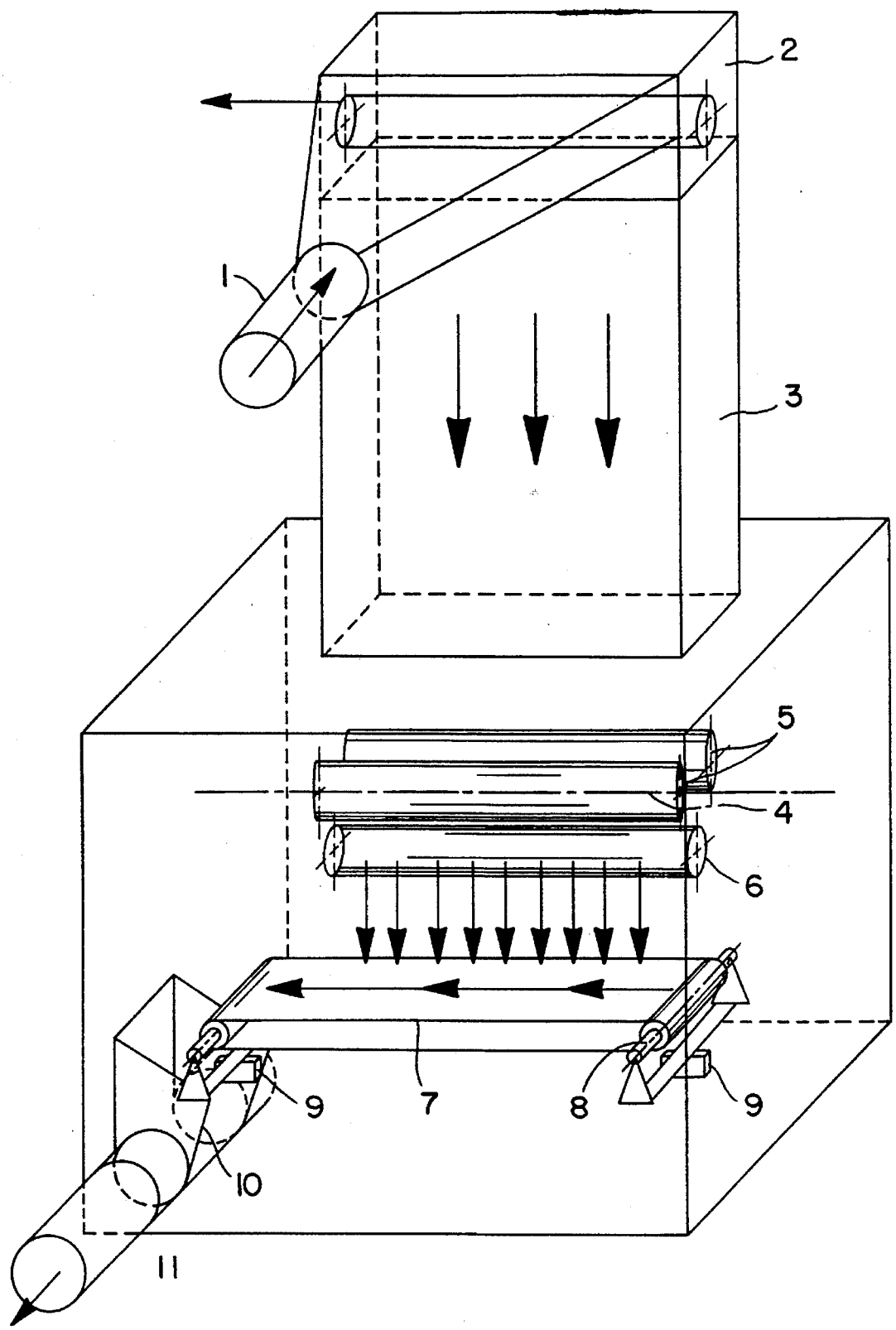

United States Patent [19]
Hergeth

[11] Patent Number: 5,459,288
[45] Date of Patent: Oct. 17, 1995

[54] TUFT WEIGHING MACHINE

[76] Inventor: Hubert A. Hergeth, Königsmühlenweg 11, 52076 Aachen, Germany

[21] Appl. No.: 103,626
[22] Filed: Aug. 6, 1993
[51] Int. Cl.[6] .......................... G01G 19/52; G01G 19/00
[52] U.S. Cl. .............................................. 177/50; 177/145
[58] Field of Search ........................................ 177/50, 145

[56] References Cited

U.S. PATENT DOCUMENTS 5,156,224  10/1992  Leifeld ........................................ 177/50

Primary Examiner—Benjamin R. Fuller
Assistant Examiner—Randy W. Gibson
Attorney, Agent, or Firm—Meltzer, Lippe, Goldstein

[57] ABSTRACT

Continuous belt weighing machine for fibre tufts. The fibre tufts are opened by an opening unit and drop onto a transport belt with weighing cells. The speed of the transport belt is constant, the speed of the feed cylinders is varied in accordance with the measurements.

5 Claims, 1 Drawing Sheet

TUFT WEIGHING MACHINE

The invention relates to a continuous weighing machine for metering the flow of flock, tufts of fibres, fabric or the like, e.g. in the textile industry. Continuous belt weighing machines have been known in the textile industry for more than 20 years. In this process, the same principle was always applied. The fibres are placed in a shaft and discharged from the shaft as a cohesive mat. The mat is passed over a transport belt. While it passes over the transport belt, the momentary loading of the belt is measured. From the transport belt the fibres are fed to a separation unit where the mat is separated into fibre tufts. The separation unit consists of feed cylinders and a separation cylinder. The axes of the feed shaft, the transport belt and the separation unit are approximately parallel. The disadvantage in this method is the influence on the measurement of the bridge formation of the material at the beinning and end of the measuring device. Depending on the material, the fibre mat has a certain rigidity. However, the measuring system only measures the sagging of the fibre mat, and the rigidity of the mat thus influences the measurement. The rigidity depends on the fibre, the fibre sepatation and the moisture.

The object of the invention is to provide a very simple metering system for fibres which is influenced as little as possible by other factors than the weight. According to the invention, this is achieved by the separation of the fibre flow into individual non-cohesive tufts prior to the weighing system. The tufts slide onto a transport belt and drop without cohesion from the transport belt into a chute. The transport belt, together with the drive, is mounted on weighing cells so that there are no influences from the drive and the belt tensioning. Preferably the transport system, consisting of the transport belt, deflection cylinders, connection frame and drive motor, can be removed as a whole from the weighing system without using tools. The transport belt runs continuously at the same speed, only the two feed cylinders of the separation unit ared varied in the rotational speed in accordance with the values measured. By offsetting the belt roller axis relative to the feed axis it is possible to use a narrow transport belt for this purpose. This brings about a good straight run of the belt, a low weight of the frame and requires only a small chute. Due to the small amount of infiltrated air, this small chute allows a small aperture in the fibre component collection line. Up to 6 weighing units can thus be connected to a fibre component collection line.

FIG. 1 shows a continous belt weighing system according to the present invention.

An embodiment of the invention is illustrated, by way of example only, in the accompanying drawing, FIG. 1, which is a schematic view in three dimensions of a continuous weighing system according to the invention.

The fibres are sucked in by a condenser 2 via a pipe 1 and delivered without pressure into a shaft 3. The feed cylinders 5 remove the material from the shaft to form a fibre mat. The removal speed is varied by the control based on the values measured by the weighing elements 9. The separation cylinder 6 separates the fibre mat into tufts. The tufts float over the entire width of the transport belt 7 which is fed and driven by the deflection cylinders 8. The transport belt and the tufts are weighed continuously by two sensors 9. From the transport belt, the tufts drop through a chute 10 into a collection transport line. A plurality of weighing devices are connected to the collection transport line. The axis 4 of the feed cylinders 5 is approximately parallel to the running direction of the transport belt 7 and offset by about 90° C. relative to the cylinder axes 8 of the transport belt 7.

I claim:

1. Continuous weighing system for fiber tufts comprising:

a feed shaft which receives fibers, an elongated separation unit connected to said feed shaft which receives said fibers from said feed shaft and outputs said fiber tufts, weighing elements, a transport belt positioned on said weighing elements and below said feed shaft, said transport belt receiving said fiber tufts from said separation unit, and a chute located at an end of said transport belt, said chute receiving said fiber tufts from said transport belt, wherein said fiber tufts drop freely from said transport belt at said end of said transport belt without further separation, and wherein a longitudinal axis of said separation unit is approximately parallel to a running direction of said transport belt so that said fiber tufts float over substantially an entire length of said transport belt.

2. The continuous weighing system of claim 1 further comprising:

deflection cylinders connected to drive said transport belt, a connection frame for supporting said deflection cylinders, and a drive motor connected to and driving at least one of said deflection cylinders, wherein the weight of said transport belt, said deflection cylinders, said connection frame and said drive motor, together with said fiber tufts located on said transport belt, are weighed continuously.

3. The continuous weighing system of claim 2 wherein said transport system is removable as a whole from said weighing elements without using tools.

4. The continuous weighing system of claim 1 comprising a plurality of said transport belts from which said fiber tufts drop, without further separation, into a common transport line.

5. The continuous weighing system of claim 1, wherein said separation unit comprises feed cylinders which receive said fibers from said feed chute and supply said fiber tufts to said transport belt, and wherein said transport belt runs at a constant speed and wherein said feed cylinders operate at a speed which is varied in accordance with a measured weight of said fiber tufts on said transport belt.

* * * * *